United States Patent
Bonneau et al.

(10) Patent No.: US 12,546,326 B2
(45) Date of Patent: Feb. 10, 2026

(54) BRUSHLESS ELECTRIC MOTOR FOR ROTATING A FAN OF A MOTOR-DRIVEN VENTILATION UNIT OF A VEHICLE

(71) Applicant: Valeo Systemes Thermiques, Le Mesnil-Saint-Denis (FR)

(72) Inventors: David Bonneau, Le Mesnil-Saint-Denis (FR); Olivier Cambronne, Creteil (FR); Dorian Vigor, Le Mesnil-Saint-Denis (FR)

(73) Assignee: Valeo Systemes Thermiques, Le Mesnil-Saint-Denis (FR)

( * ) Notice: Subject to any disclaimer, the term of this patent is extended or adjusted under 35 U.S.C. 154(b) by 281 days.

(21) Appl. No.: 18/266,684

(22) PCT Filed: Oct. 6, 2021

(86) PCT No.: PCT/EP2021/077605
§ 371 (c)(1),
(2) Date: Jun. 12, 2023

(87) PCT Pub. No.: WO2022/122214
PCT Pub. Date: Jun. 16, 2022

(65) Prior Publication Data
US 2024/0044336 A1     Feb. 8, 2024

(30) Foreign Application Priority Data

Dec. 11, 2020   (FR) ........................................ 2013036

(51) Int. Cl.
*H02K 5/22*      (2006.01)
*F01P 5/04*      (2006.01)
(Continued)

(52) U.S. Cl.
CPC ................. *F04D 25/06* (2013.01); *F01P 5/04* (2013.01); *H02K 5/225* (2013.01); *H02K 7/14* (2013.01); *F01P 2005/046* (2013.01)

(58) Field of Classification Search
CPC .. H02K 5/10; H02K 5/18; H02K 5/22; H02K 5/225; H02K 7/14; H02K 11/33;
(Continued)

(56) References Cited

U.S. PATENT DOCUMENTS 4,800,307 A  *  1/1989  Papst ..................... H02K 29/08
                                                                  310/67 R
7,015,605 B1     3/2006  Peter et al.
(Continued)

FOREIGN PATENT DOCUMENTS

FR      2777136 A1  *  10/1999  ............. H02K 23/66
FR      2806854 A1  *   9/2001  ............. H02K 5/225
(Continued)

OTHER PUBLICATIONS

Translation of Written Opinion of the International Searching Authority for PCT/EP2021/077605 (Year: 2021).*
(Continued)

*Primary Examiner* — Edgardo San Martin
(74) *Attorney, Agent, or Firm* — Osha Bergman Watanabe & Burton LLP

(57)     ABSTRACT

Described is a brushless electric motor for rotating a fan of a ventilation unit of a vehicle. The brushless electric motor includes at least one electric conduction device, a rotor, a stator equipped with at least two coils and a casing housing a servo circuit and a power circuit. The electric conduction device is configured to convey an electric current to the power circuit from a power supply of the vehicle. The power circuit is configured to connect the electric conduction device electrically to the coils, where the electrical connec-
(Continued)

tion is dependent upon the servo circuit. At least a portion of the casing is interposed between at least a portion of the power circuit and a connector placed at one end of the electric conduction device.

9 Claims, 3 Drawing Sheets

(51) Int. Cl.
  *F04D 25/06* (2006.01)
  *F04D 25/08* (2006.01)
  *H01R 12/53* (2011.01)
  *H02K 7/14* (2006.01)
  *H02K 11/30* (2016.01)
  *H02K 11/33* (2016.01)

(58) Field of Classification Search
  CPC .... H02K 11/30; H02K 21/22; H02K 2211/03; F04D 25/06; F04D 25/0693; F04D 25/08; H01R 12/53; H01R 12/52; H01R 12/51; F01P 5/04; F01P 2005/046
  See application file for complete search history.

(56) References Cited

U.S. PATENT DOCUMENTS

| | | | | |
|---|---|---|---|---|
| 9,000,633 | B2* | 4/2015 | Yamasaki | ............ B62D 5/0406 |
| | | | | 310/71 |
| 10,087,759 | B2* | 10/2018 | Yamashita | ............... H02K 5/10 |
| 10,720,810 | B2 | 7/2020 | Sigg et al. | |
| 11,133,723 | B2* | 9/2021 | Hirsch | ...................... H02K 7/14 |
| 11,920,601 | B2* | 3/2024 | Kim | ...................... F04D 29/703 |
| 2019/0036426 | A1* | 1/2019 | Umeda | .................... H02K 5/22 |
| 2019/0181727 | A1* | 6/2019 | Makino | ................. H02K 11/215 |
| 2020/0235631 | A1 | 7/2020 | Wisner et al. | |

FOREIGN PATENT DOCUMENTS

| | | | | | |
|---|---|---|---|---|---|
| FR | | 3048465 | A1* | 9/2017 | ............. H02K 9/197 |
| FR | | 3083035 | A1 | 12/2019 | |
| FR | | 3128816 | A1* | 5/2023 | ............. H01R 24/68 |
| JP | | 2020161480 | A* | 10/2020 | ......... F04D 13/0693 |

OTHER PUBLICATIONS

International Search Report and Written Opinion in corresponding International Application No. PCT/EP2021/077605, dated Nov. 29, 2021 (12 pages).

* cited by examiner

[fig 1]
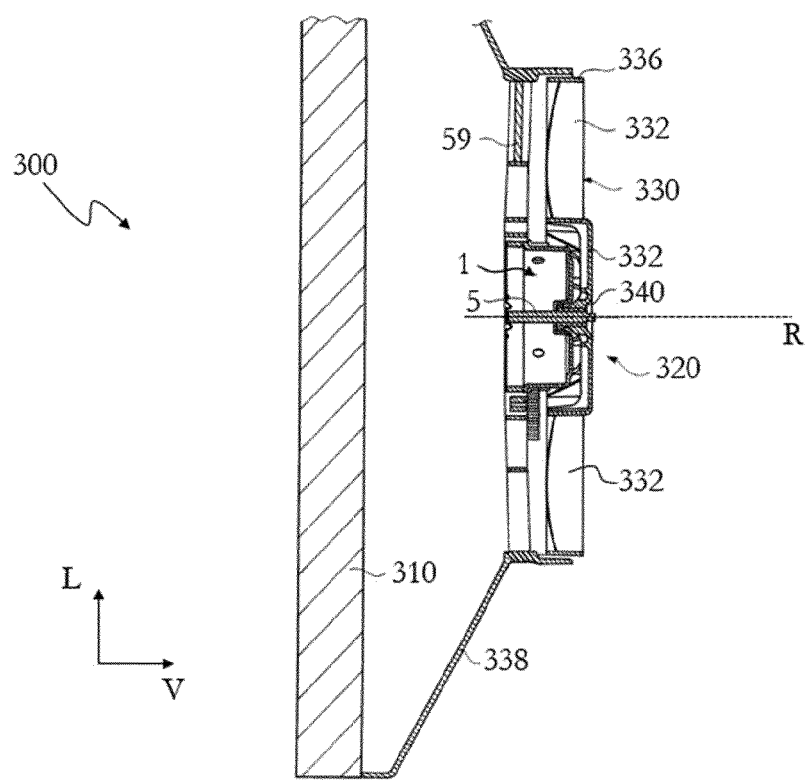

[fig 2]
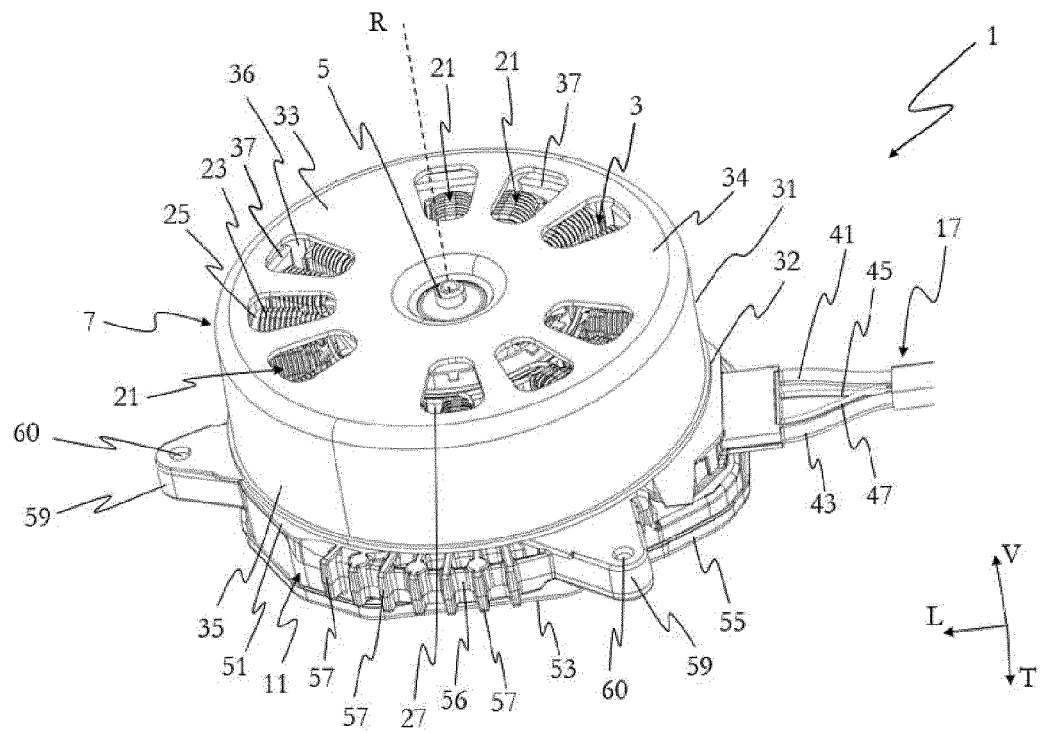
[fig 3]
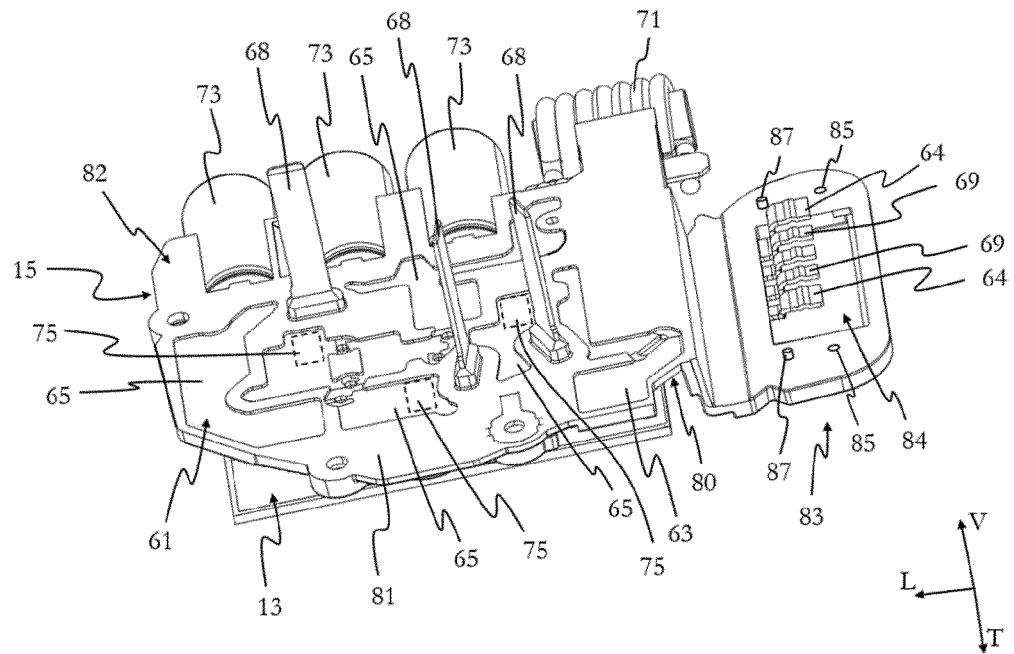

[fig 4]
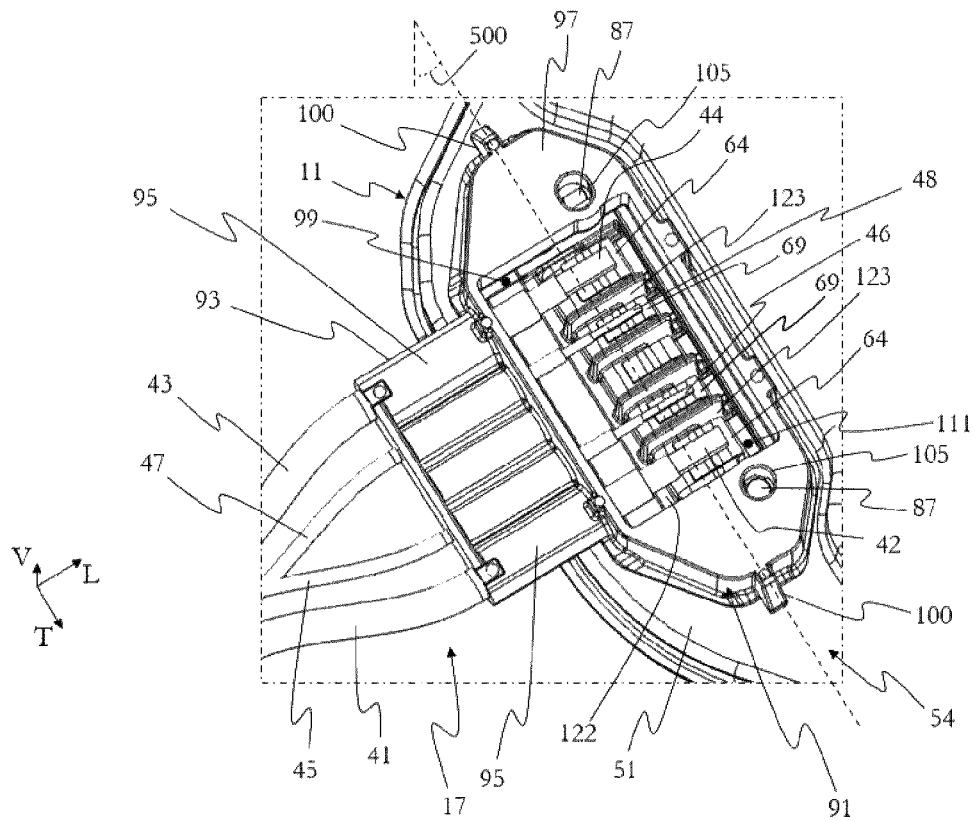
[fig 5]
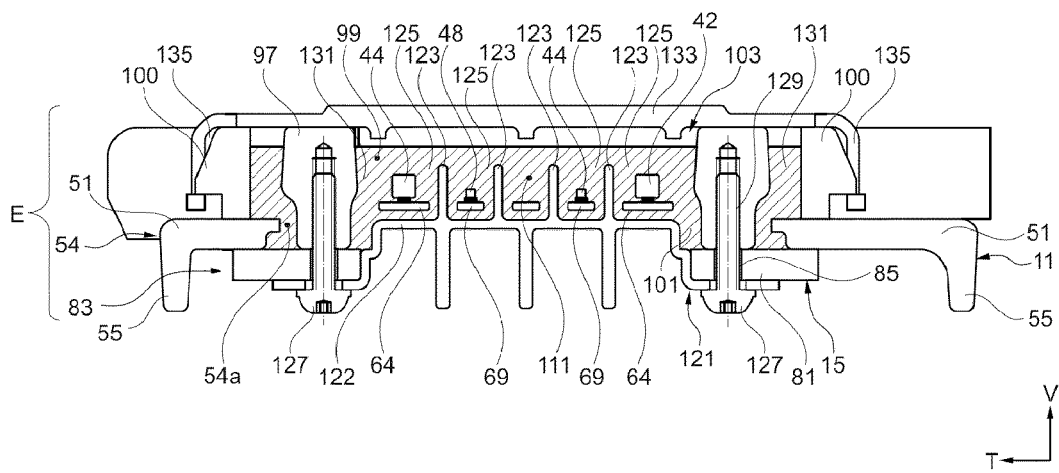

BRUSHLESS ELECTRIC MOTOR FOR ROTATING A FAN OF A MOTOR-DRIVEN VENTILATION UNIT OF A VEHICLE

BACKGROUND

The present invention relates to the field of thermal treatment modules for vehicles. More particularly, the invention concerns brushless electric motors and fan systems of the thermal treatment module that are equipped with these brushless electric motors.

A brushless electric motor for a fan system generally comprises a rotor and a stator surmounting an electronics housing. The stator comprises a polyphase winding which is formed; for example, from individual coils, each of which is wound around a tooth that is part of the stator. The electronics housing accommodates a power circuit configured to provide a polyphase electrical power supply to the coils of the stator from an electric current provided by the vehicle. For example, the electric current may come from an electrical energy storage device of the vehicle. The electric current needed to provide the polyphase power supply to the coils of the stator is conveyed by a conduction assembly. The conduction assembly is electrically connected, for the one part, to the power circuit and, for the other part, to the electrical energy storage device of the vehicle.

The electronics housing accommodating the power circuit is configured to prevent the power circuit from being exposed to water or moisture. The electrical connections between the power circuit and the conduction assembly are formed by welding on the outside of the electronics housing. In order to protect the electrical connections from water and moisture, two layers of synthetic material are molded in succession on and around the electrical connections.

However, the molding of synthetic material on and around the welds of the electrical connections can subject the welds to mechanical forces, which lead to deformations and loss of leaktightness. In addition, the process for assembling the various parts of the brushless electric motor whilst still ensuring the leaktightness of the motor is lengthy and complex.

The aim of the present invention is to overcome at least one of the drawbacks mentioned above and also to bring about further advantages by proposing a novel brushless, electric motor for rotating a cooling fan of a fan system of a thermal treatment module for a vehicle.

Another aim of the invention is to produce a simple electrical connection, that performs well, between the power circuit and the conduction device which supplies this power circuit with current from the vehicle, whilst still improving the leaktightness of the existing solutions.

SUMMARY

The present invention proposes a brushless electric motor for rotating a cooling fan of a fan system, notably making up a thermal treatment module for a vehicle. The brushless electric motor according to the invention comprises at least one electrical conduction device, a rotor, a stator equipped with at least two coils and a housing accommodating a feedback control circuit and a power circuit, the electrical conduction device being configured to convey an electric current to the power circuit from an electrical power supply of the vehicle, the power circuit being configured to electrically connect the electrical conduction device to the coils, the electrical connection being controlled by the feedback control circuit. At least one part of the housing is interposed between at least one portion of the power circuit and a connector placed at one end of the electrical conduction device.

Thus, the part of the housing is sandwiched between the first portion of the power circuit and the connector. The result notably is relatively stable and reproducible mutual positioning of these elements.

According to one embodiment, the portion of the power circuit, the connector, and that part of the housing that is interposed between the portion of the power circuit and the connector form a stack.

According to one embodiment, the stack comprises a through-duct which extends from a first opening formed in the first portion of the power circuit to a second opening formed in the connector.

According to one embodiment, at least one electrical connection between the electrical conduction device and the power circuit is disposed in the through-duct.

According to one embodiment, the electrical connection is a weld between at least one electrical wiring of the electrical conduction device and at least one electrically conductive track of the power circuit.

According to one embodiment, the through-duct is filled, preferably entirely, with at least one sealing element.

According to one embodiment, the electrical connection is embedded in the sealing element. This makes it possible to enhance the leaktightness of the electrical connection between the electrical conduction device and the power circuit and thus to enhance the protection of the power circuit against possible traces of moisture.

According to one embodiment, the sealing element is composed of at least one polymer material.

According to one embodiment, the polymer material is selected from the group comprising a polysiloxane, a polyurethane, and a mixture thereof.

According to one embodiment, the sealing element has a Young's modulus less than or equal to 3 GPa.

According to one embodiment, the first opening is at least partially, preferably completely, closed by a cap. This notably makes it possible to protect the sealing element and/or enhance the protection of the power circuit against moisture and water in the vicinity of this first opening.

According to one embodiment, the cap comprises at least one compartmentalizing element of the through-duct so as to insulate a plurality of electrical connections from one another, the electrical connections being those that are formed between the electrical conduction device and the power circuit.

According to one embodiment, the compartmentalizing element is a low wall which extends from one face of the cap toward the second-opening of the through-duct.

According to one embodiment, the cap is fixed to the connector by at least one fixing element.

According to one embodiment, the fixing element passes through the power circuit and/or the housing.

According to one embodiment, the fixing element is a screw or a rivet.

According to one embodiment, the rivet is formed integrally with the cap.

According to one embodiment, the second opening is closed by a cover which at least partially, preferably completely, covers the connector. This makes it possible to protect the connector in the region of the second opening and thus to enhance the protection of the power circuit against moisture and water in the vicinity of this second opening.

According to one embodiment, the cover comprises at least one element for attachment to the connector.

According to one embodiment, the attachment element interacts with at least one holding element of the connector.

According to one embodiment, the attachment element is a clip and the holding element is a lug.

According to one embodiment, the power circuit comprises at least one element for centering the power circuit and the housing.

According to one embodiment, the centering element is an element for centering the power circuit and the connector. The centering element makes it possible to mutually center the components of the stack.

According to one embodiment, the power circuit comprises a support which bears at least one electrically conductive track and at least one inverter. The inverter is configured to transform the direct current provided by the electrical power supply of the vehicle into an alternating electric current so as to generate a rotary magnetic field in the stator and thus to turn the rotor.

According to one embodiment, the electrically conductive track takes the form of a bar with a rectangular cross section.

According to one embodiment, the electrically conductive track has a cross section greater than or equal to 4 mm$^2$ as seen in a plane perpendicular to an overall direction of extent of the electrically conductive track.

According to one embodiment, the housing is a heat sink configured to dissipate the heat generated by the feedback control circuit and/or the power circuit into the external environment of the housing.

According to one embodiment, the housing is composed of at least one heat-conducting material selected from the group comprising copper, aluminum, a thermally conductive polymer, and a mixture thereof. The housing also acts as protection against electromagnetic fields.

According to one embodiment, the electrical conduction device comprises at least one electrical wiring set.

Here, and throughout the following text, "electrical wiring" should be understood as meaning one or more electrically conductive element(s) surrounded by at least one electrically insulating layer.

According to one embodiment, the electrical wiring set comprises two wirings configured to convey the electric current from the electrical power supply of the vehicle to the power circuit and two feedback control wirings that are intended to connect the feedback control circuit to the vehicle and have the function of transmitting signals from the vehicle to the brushless electric motor and from the brushless electric motor to the vehicle.

According to one embodiment, the connector is made from a synthetic material.

The invention also provides a fan system of a thermal treatment module for a vehicle, comprising a cooling fan and at least one brushless electric motor according to the invention, the brushless electric motor being connected to the cooling fan by a shaft and being configured to drive the rotation of the cooling fan about an axis of rotation.

The invention moreover provides a thermal treatment module for a vehicle, having at least one fan system according to the invention.

According to one embodiment, the thermal treatment module comprises a heat exchanger, and wherein the fan system is configured to interact with the heat exchanger.

The invention also proposes a method for assembling a brushless electric motor according to the invention. The assembly method comprises a step of assembling the power circuit with the housing, a step of installing the connector on the housing, a step of welding between the electrical conduction device and the power circuit, a step of fixing the cap to the connector using the fixing element, and a step of filling the cavity with the sealing element in order to embed the electrical connection between the electrical conduction device and the power circuit.

According to one embodiment, the assembly method comprises a step of fixing then cover.

BRIEF DESCRIPTION OF DRAWINGS

Further features and advantages of the invention will become more apparent from the following description, and also from a plurality of exemplary embodiments that are given by way of nonlimiting indication with reference to the appended schematic drawings, in which:

FIG. 1 is a schematic view in section of a thermal treatment module comprising a fan system according to the invention;

FIG. 2 is a schematic view in perspective of a brushless electric motor according to the invention in an assembled configuration as shown in FIG. 1;

FIG. 3 is a schematic view in perspective of a power circuit of the brushless motor of FIG. 2;

FIG. 4 is a schematic view of a detail of the connection between an electrical conduction device of the brushless electric motor of FIG. 2 and the power circuit of FIG. 3;

FIG. 5 is a view in section along a vertical and transverse plane of FIG. 4.

DETAILED DESCRIPTION

It should first of all be noted that although the figures set out the invention in detail for its implementation, they may, of course, be used to better define the invention if necessary. It should also be noted that, in all of the figures, elements that are similar and/or perform the same function are indicated by the same numbering.

In the following description, a direction of a longitudinal axis L, a direction of a transverse axis T, and a direction of a vertical axis V are represented by a trihedron (L, T, V) in the figures. A horizontal plane is defined as being a plane perpendicular to the vertical axis V, a longitudinal plane is defined as being a plane perpendicular to the transverse axis T, and a transverse plane is defined as being a plane perpendicular to the longitudinal axis L.

With reference to FIG. 1, the thermal treatment module 300 shown in FIG. 1 comprises a heat exchanger 310, which forms part of the cooling circuit of a combustion engine, and a fan system 320 in order to provide the forced circulation of a flow of air F through the heat exchanger 310.

The heat exchanger 310 conventionally has a core of tubes through which a cooling fluid, such as an aqueous solution of ethylene glycol, passes. The flow of air F passes through said heat exchanger perpendicularly to the core of tubes. The engine of the vehicle is cooled by an exchange of heat between the flow of air that passes through the core and the fluid in the cooling circuit.

The fan system 320 faces the radiator core. The fan system 320 has a cooling fan 330 driven in rotation by a brushless electric motor 1. The brushless electric motor 1 is fixed to a holding fairing 338 attached to a periphery of the heat exchanger 310.

The cooling fan 330 is made up of multiple blades 332 mounted on a bowl 334 and surrounded by a circular fairing 336, which itself is accommodated inside the holding fairing 338. The bowl 334 of the cooling fan 330 is secured to a shaft 5 of the brushless electric motor 1, to which it is fixed via a central nut 340. The brushless electric motor 1 is connected to the fairing 338 by fixing lugs 59.

With reference to FIG. 1 and to FIG. 2, the brushless electric motor 1 comprises a housing 11, a stator 3 surmounting the housing 11, and a rotor 7 provided with a shaft 5 and mounted so as to be able to rotate about an axis of rotation R. The axis of rotation R is parallel to the vertical axis V as defined above. The axis of rotation R is, for example, parallel to a longitudinal axis of the vehicle when the thermal module 300 is mounted on the vehicle. The stator 3 is fixed with respect to the housing 11. The rotor 7 can rotate freely with respect to the stator 3.

In the embodiment illustrated in FIG. 2, the stator 3 is mounted fixedly on an external face 52 of an upper wall 51 of the housing 11. The stator 3 extends in an overall plane of extent parallel to the horizontal plane defined above. The shaft 5 extends along an axis of extent perpendicular to the overall plane of extent of the stator 3. In other words, the shaft 5 extends along the vertical axis V from the main plane of extent of the stator 3 to the rotor 7.

The stator 3 comprises a plurality of coils 21, for example produced by winding one or more metal wires 23 around teeth 25 of a main part 27 of the stator 3. The coils 21 are uniformly disposed in a circle around the shaft 5, as seen projected into the horizontal plane.

The rotor 7 is mounted fixedly on the shaft 5. The axis of rotation R of the rotor 7 coincides with the axis of extent of the shaft 5. The rotor 7 comprises a bell housing 31 of cylindrical shape with a circular base, a longitudinal axis of which substantially coincides with the axis of rotation R. The bell housing 31 forms a Faraday cage around the stator 3. The bell housing 31 is open at a first longitudinal end 32 and closed via an upper partition 34 at a second longitudinal end 33. The bell housing 31 is delimited radially by a peripheral partition 35. A housing 36 is delimited by the peripheral partition 35 and the upper partition 34. The housing 36 receives at least a part of the stator 3, that is to say, in the example shown in FIG. 2, the coils 21. In other words, the peripheral partition 35 of the rotor 7 surrounds the coils 21 of the stator 3.

As shown in FIG. 2, the rotor 7 has a plurality of permanent magnets 37. The permanent magnets 37 are arranged in the housing 36. The permanent magnets 37 are uniformly distributed over an internal face of the peripheral partition 35, as seen projected into the horizontal plane. The permanent magnets 37 are magnetic poles which tend to follow the rotary magnetic field generated by the coils 21 of the stator 3 and thus make it possible to turn the rotor 7.

With reference to FIGS. 2 to 5, the housing 11 of the brushless electric motor 1 delimits an internal volume in which a feedback control circuit 13 and a power circuit 15 are accommodated. The power circuit 15 accommodated in the housing 11 is configured to electrically connect an electrical conduction device 17 to the coils 21 via the electrical power supply of the vehicle. The electrical connection between the power circuit 15 and the coils 21 is controlled by the feedback control circuit 13. At least one part of the housing 11 is interposed between at least one portion of the power circuit 15 and a connector 91 placed at one end of the electrical conduction device 17. This arrangement and the electrical connection between the power circuit 15 and the electrical conduction device 17 will be described in more detail below.

In the embodiment shown in FIG. 2, the housing 11 is closed and sealed. The housing 11 comprises a lower wall 53 connected to the upper wall 51 by a vertical wall 55. The upper wall 51, the lower wall 53 and the vertical wall 55 delimit the internal volume. The upper wall 51 and the lower wall 53 extend parallel to the horizontal plane as defined above. The vertical wall 55 extends circumferentially from an edge of the upper wall 51 toward an edge of the lower wall 53, parallel to the vertical axis V.

The housing 11 is composed of at least one heat-conducting material, which allows it to be a heat sink. This notably makes it possible to dissipate the heat generated by the stator 3, the rotor 7, the power circuit 15 and/or the feedback control circuit 13 when the brushless electric motor 1 is operating. The heat-conducting material is selected from aluminium, copper, a heat-conducting polymer, and a mixture thereof.

The housing 11 comprises fins 57. A first part of the fins 57 protrudes from an outer face 52 of the upper wall 51 and a second part of the fins 57 protrudes from an outer face 56 of the vertical wall 55. The fins make it possible to improve the exchange of heat between the housing 11 and the air external to the housing 11. The fins of the first part of the fins 57 are formed integrally with the upper wall 51 of the housing 11. The fins of the second part of the fins 57 are formed integrally with the vertical wall 55 of the housing 11.

The one or more materials making up the housing 11 are also sufficiently electrically conductive to absorb at least some of the electromagnetic fields emitted by the power circuit 15 and/or the feedback control circuit 13. The electronic components of the vehicle are thus protected from the electromagnetic fields generated by the power circuit 15 and/or the feedback control circuit 13.

With reference to FIG. 2, the electrical power supply of the vehicle is conveyed to the power circuit 15 by the electrical conduction device 17. The electrical conduction device 17 comprises a core of electrical wirings 41, 43, 45, 47 having at least two power supply wirings 41, 43 configured to convey the electric current from the electrical power supply of the vehicle to the power circuit 15, and two feedback control wirings 45, 47 for connecting the feedback control circuit 13 to the vehicle. The two feedback control wirings 45, 47 have the function of transmitting signals from the vehicle to the brushless electric motor 1 and/or from the brushless electric motor 1 to the vehicle. The signals transmitted can, for example, concern the operation (on/off) of the brushless electric motor 1 and/or an operating setpoint of the brushless electric motor 1 and/or a diagnosis of the status of the brushless electric motor 1.

Here, and throughout the following text, "electrical wiring" should be understood as meaning one or more electrically conductive element(s) surrounded by at least one electrically insulating layer.

With reference to FIGS. 2 to 5, the electrical conduction device 17 comprises a connector 91 arranged at one end of the electrical wiring set, that is to say at one end of the electrical conduction device 17. The electrical wirings 41, 43, 45, 47 each have at least one end that is received in the connector 91 in order to be attached to the power circuit 15 and to the feedback control circuit 13. The connector 91 is made from a synthetic material, for example by injecting a polymerizable resin into a mold.

FIG. 4 more specifically illustrates the region in which the electrical wirings 41, 43, 45, 47 of the electrical conduction device 17 are electrically connected to the power circuit 15 and feedback control circuit 13, which are received in the housing 11. For the sake of clarity of the figure, a sealing element 131 has been omitted.

FIG. 5 is a view in section of FIG. 4 along the sectional plane 500. In this figure, a sealing element 131 is present and has therefore not been omitted.

With reference to FIG. 4 and FIG. 5, the connector 91 has a body 97 and a guide element 93 for guiding the ends of the electrical wirings 41, 43, 45, 47 toward the housing 11. The guide element 93 sits next to the body 97. More specifically, the guide element 93 of the connector 91 comprises multiple tubes 95 configured to each receive one end of an electrical wiring 41, 43, 45, 47 whilst still ensuring electrical insulation of the ends of the other electrical wirings 41, 43, 45, 47.

As shown in FIG. 4 and FIG. 5, the body 97 of the connector 91 has a through-passage 99 from a first orifice 101 to a second orifice 103. The through-passage 99 extends in a direction parallel to the vertical axis V defined above.

The through-passage 99 accommodates the conductive ends 42, 44, 46, 48 of the electrical wirings 41, 43, 45, 47 that are guided through the tubes 95 described above. It should be understood here that "conductive end" 42, 44, 46, 48 means an exposed end of an electrical wiring 41, 43, 45, 47, that is to say the end of the electrically conductive element of said wiring stripped of its electrically insulating layer.

With reference to FIG. 3, the power circuit 15 extends in an overall plane of extent perpendicular to the axis of rotation R of the rotor 7 with a first face 80, and a second face 82 opposite the first face 80. The feedback control circuit 13 is fixed to the first face 80 of the power circuit 15. The power circuit 15 is fixed to the housing 11 on an inner face 50 of the upper wall 51 of the housing 11. Thus, the second face 82 of the power circuit 15 faces the inner face 50 of the upper wall 51 of the housing 11. In other words, the power circuit 15 is interposed between the feedback control circuit 13 and the upper wall 51 of the housing 11, along the axis of rotation R.

The power circuit 15 comprises at least one electrically conductive track 61 and at least one support 81 for the electrically conductive track 61.

The electrically conductive track 61 comprises at least one first segment 63 and at least one second segment 67 that is electrically connected to the first segment 63 by a plurality of intermediate segments 65. The segments 63, 65, 67 of the electrically conductive track 61 each take the shape of a bar with a rectangular cross section as seen projected into a plane perpendicular to a main direction of conduction of the current. Each segment 63, 65, 67 of the electrically conductive track 61 has a cross section greater than or equal to 4 mm² as seen projected into a plane perpendicular to the main direction of conduction of the electric current.

With reference to FIGS. 3 to 5, the electrically conductive track 61 comprises two first segments 63 each having an electrical connection element 64 welded directly to the conductive ends 42, 44, 46, 48 of the power supply wirings 41, 43 of the electrical conduction device 17.

Each electrical connection element 64 of each first segment 63 has an S-shaped profile as seen projected into the longitudinal plane as defined above. The electrical connection elements 64 pass through a window 84 located in a portion 83 of the support 81 along a direction from the first face 80 to the second face 82. The electrical connection elements 64 emerge from the window 84.

In a configuration assembled with the brushless electric motor 1, the electrical connection elements 64 pass through a cutout 54a in the upper wall 51 of the housing 11. The cutout 54a in the upper wall 51 is arranged in a part 54 of the housing 11. The electrical connection elements 64 are received in the through-passage 99 of the connector 91. To produce the electrical connection between the power supply wirings 41, 43 and the power circuit 15, each conductive end 42, 44 is connected to an electrical connection element 64 of the power circuit 15 by welding.

The power circuit 15 comprises a plurality of electrical components 71, 73, 75. The plurality of electrical components 71, 73, 75 comprises at least one self-inductor 71, at least one capacitor 73, and at least one inverter 75 (shown in dashed line). The plurality of electrical components 71, 73, 75 is borne by the electrically conductive track 61.

The inverters 75 are arranged on the first face 80 of the power circuit 15. The inverters 75 are configured to transform the direct current provided by the electrical power supply of the vehicle into an alternating electric current so as to generate a rotary magnetic field in the stator 3 and thus to turn the rotor 7. The inverter 75 comprises at least one transistor, preferably a metal oxide semiconductor field effect transistor, also referred to by the acronym MOSFET.

The electrically conductive track 61 comprises three second segments 67, each of which has an electrical connection strip 68 welded directly to an electrical connection strip (not shown) of the stator 3.

With reference to FIGS. 3 to 5, the feedback control circuit 13 comprises electrical connection members 69 intended to be welded to the conductive ends 46, 48 of the feedback control wirings 45, 47 of the electrical conduction device 17. In other words, the electrical connection members 69 of the feedback control circuit 13 make it possible to connect the feedback control wirings 45, 47 to the feedback control circuit 13. The electrical connection members 69 pass through the window 84 of the support 81 along a direction from the first face 80 to the second face 82 of the support 81. The electrical connection members 69 emerge from the window 84.

In an assembled configuration of the brushless electric motor 1, the electrical connection members 69 pass through the cutout 54a in the upper wall 51 of the housing 11 and are received in the through-passage 99 in the connector 91. To produce the electrical connection between the feedback control wirings 45, 47 and the feedback control circuit 13, each conductive end 46, 48 is connected to an electrical connection member 69 of the feedback control circuit 13 by welding.

The portion 83 of the power circuit 15 comprises at least one centering element 87 which makes it possible to center the power circuit 15 and the body 97 of the connector 91. In the embodiment shown in FIG. 4, the portion 83 of the power circuit 15 comprises two centering elements 87 distributed on either side of the window 84 and aligned along the transverse axis T. The centering elements 87 take the form of pads which extend from the second face 82 of the support 81 toward the connector 91 along the vertical axis V. Each centering element 87 extends through the cutout 54a in the upper wall 51 of the housing 11. Each centering element 87 interacts with a centering hole 105 made in the body 97 of the connector 91. The centering element 87 makes it possible to mutually center the components. According to an embodiment which is not shown, the power circuit 15 comprises at least one element for centering the power circuit 15 and the housing 11.

With reference to FIGS. 4 and 5, in an assembled configuration of the brushless electric motor 1, the portion 83 of the power circuit 15 comprising the window 84, the part 54 of the housing 11 comprising the cutout 54a, and the connector 91 of the electrical conduction device 17 are stacked one on top of another along a direction parallel to the vertical axis V. More specifically, the part 54 of the housing 11 is interposed between the portion 83 of the power circuit 15 and the connector 91. The portion 83 of the power circuit 15 comprising the window 84, the part 54 of the housing 11 comprising the cutout 54a, and the connector 91 of the electrical conduction device 17 thus form a stack E.

In this configuration, the window 84, the cutout 54a and the through-passage 99 of the connector 91 face one another. They thus form a through-duct 111 which extends from a first opening corresponding to the window 84 of the power circuit 15 to a second opening corresponding to the second orifice 103 made in the connector 91.

Thus, in the remainder of the description, the terms "window" and "first opening" will be used without distinction and with the same reference, which is 84. The same will apply to the terms "second orifice" and "second opening", which will be used without distinction and with the same reference, which is 103.

As can be seen in FIGS. 4 and 5, the electrical connections, which are welds, between the electrical connection elements 64 and the conductive ends 42, 44 of the power supply wirings 41, 43 are disposed in the through-duct 111. Similarly, the electrical connections, which are welds, between the electrical connection members 69 and the conductive ends 46, 48 of the power supply wirings 45, 47 are arranged in the through-duct 111.

The first opening 84 is completely closed by a cap 121 so as to protect the through-duct 111. The cap 121 comprises a plate 122 which extends in a plane of extent perpendicular to the axis of rotation R. The cap 121 comprises compartmentalizing elements 123 which extend from one face of the plate 122 toward the second opening 103 of the through-duct 111. The compartmentalizing elements 123 extend in the through-duct 111. The plate 122 is formed integrally with the compartmentalizing elements 123.

The compartmentalizing elements 123 take the form of a low wall. The compartmentalizing elements 123 make it possible to create as many compartments 125 as there are electrical connections between the electrical conduction device 17 and the power circuit 15 and electrical connections between the electrical conduction device 17 and the feedback control circuit 13. In other words, each compartment 125 accommodates one electrical connection. The risk of a short circuit occurring between the adjacent electrical connections is thus reduced.

The cap 121 arranged at the first opening 84, the portion 83 of the power circuit 15 comprising the window 84, the part 54 of the housing 11 comprising the cutout 54a, and the connector 91 are held together by at least one fixing element 127.

In the example shown, there are two fixing elements 127. The fixing elements 127 are screws which pass through the plate 122 of the cap 121. The fixing elements 127 pass through the support 81 of the power circuit 15 at bores 85 made in the portion 83 of the support 81. The fixing elements 127 also pass through the housing 11 in order to each interact with a tapped thread 129 made in the connector 91. The cap 121 is thus fixed to the connector 91. Each of the fixing elements 127 passes through the housing 11 at the cutout 54a in the upper part 51 of the housing 11.

In an embodiment which is not shown, the fixing elements 127 are rivets formed integrally with the cap 121. The rivets then pass through the plate 122 of the cap 121, the power circuit 15, the housing 11 and the connector 91 in order that a free end of the rivets is headed to make it possible to hold all these components together.

With reference to FIG. 5, in order to enhance the protection of the electrical connections produced in the through-duct 111, the invention provides for the latter to be at least partially filled with a sealing element 131. Thus, the part of the through-duct comprised between the cap 121 and the second opening 103 is filled with the sealing element 131. Consequently, the electrical connections arranged in the through-duct 111 are embedded in the sealing element 131.

The sealing element 131 is composed of at least one polymer material which is flexible enough to tolerate mechanical deformations without cracking and leaktight enough to avoid water entering the through-duct 111. The sealing element 131 has a Young's modulus less than or equal to 3 GPa. By way of nonlimiting example, the polymer material selected the polymer material is selected from the group comprising a polysiloxane, a polyurethane, and a mixture thereof.

In the exemplary embodiment illustrated in FIGS. 2 to 5, in order to fully protect the through-duct 111, the first orifice 84 is closed by a cover 133. The first orifice 84 is completely covered by the cover 133. The cover 133 is fitted to the body 97 of the connector 91 by means of at least one attachment element 135. In the example illustrated more particularly by FIG. 2, the attachment element 135 takes the form of a hook configured to interact by clipping with a holding member 100 arranged on the body 97. The holding member 100 is a lug.

The method for assembling the brushless electric motor 1 will now be described with reference to FIGS. 2 to 5.

The assembly method comprises a first step of assembling the power circuit 15 with the housing 11. The power circuit 15 is fixed to the inner face of the upper wall 51 of the housing 11 using screws. Then, the connector 91 is installed on the outer face of the upper wall 51 of the housing using centering elements 87.

A step of welding between the electrical connection elements 64 and the electrical ends 42, 44 of the power supply wirings 41, 43 can be carried out. Concomitantly, the electrical connection members 69 can be welded to the electrical ends 46, 48 of the power supply wirings 45, 47.

The welding operations are followed by installing the cap 121 at the first orifice 84 of the through-duct 111 and fixing the cap 121 using the fixing element 127. Thus, the cap 121, the power circuit 15, the housing 11 and the connector 91 are secured to one another.

The through duct 111 delimited at one end by the cap 121 is then filled with the sealing element 131 in order to embed the electrical connections between the electrical conduction device 17 and the power circuit 15 and the electrical connections between the electrical conduction device and the feedback control circuit 13.

The assembly method lastly comprises a step of fixing the cover 133 so as to cover the second opening 103, thus protecting the through-duct 111 and the sealing element 131.

The first step can be preceded by a step of fixing the feedback control circuit 13 to the power circuit 15.

The invention thus makes it possible in a simple way to produce, between the electrical conduction device 17 and the power circuit 15 and the feedback control circuit 13, an electrical connection protected from the environment external to the brushless electric motor 1.

Of course, the invention is not limited to the examples that have just been described, and numerous modifications may be made to these examples without departing from the scope of the invention, provided that, in accordance with the invention, these modifications comprise a connector having one or more of the features described above, and provided that these modifications bring about a relative configuration notably of the power circuit 15, the housing 11 and the connector 91 as described above.

The invention claimed is:

1. A brushless electric motor for rotating a cooling fan of a fan system for a vehicle, comprising:
   at least one electrical conduction device;
   a rotor;
   a stator equipped with at least two coils; and
   a housing accommodating a feedback control circuit and a power circuit,
   the electrical conduction device being configured to convey an electric current to the power circuit from an electrical power supply of the vehicle, the power circuit being configured to electrically connect the electrical conduction device to the coils, the electrical connection being controlled by the feedback control circuit,
   wherein at least one part of the housing is interposed between at least one portion of the power circuit and a connector placed at one end of the electrical conduction device,
   wherein the portion of the power circuit, the connector, and the part of the housing that is interposed between the portion of the power circuit and the connector form a stack, and wherein the stack comprises a through-duct which extends from a first opening formed in the first portion of the power circuit to a second opening formed in the connector.

2. The brushless electric motor as claimed in claim 1, wherein at least one electrical connection between the electrical conduction device and the power circuit is disposed in the through-duct.

3. The brushless electric motor as claimed in claim 2, wherein the electrical connection is a weld between at least one end of at least one electrical wiring of the electrical conduction device and at least one electrically conductive track of the power circuit.

4. The brushless electric motor as claimed in claim 1, wherein the through-duct is filled with at least one sealing element.

5. The brushless electric motor as claimed in claim 1, wherein the first opening is at least partially closed by a cap.

6. The brushless electric motor as claimed in claim 5, comprising multiple electrical connections between the electrical conduction device and the power circuit, wherein the cap comprises at least one compartmentalizing element of the through-duct configured to insulate a plurality of electrical connections from one another.

7. The brushless electric motor as claimed in claim 5, wherein the cap is fixed to the connector by at least one fixing element.

8. The brushless electric motor as claimed in claim 1, wherein a second opening is closed by a cover which at least partially covers the connector.

9. A fan system of a thermal treatment module for a vehicle, comprising:
   a cooling fan; and
   at least one brushless electric motor as claimed in claim 1, the brushless electric motor being connected to the cooling fan by a shaft and being configured to drive the rotation of the cooling fan.

* * * * *